US010933737B2

(12) United States Patent
Tamura et al.

(10) Patent No.: US 10,933,737 B2
(45) Date of Patent: Mar. 2, 2021

(54) IN-WHEEL MOTOR DRIVE DEVICE

(71) Applicant: NTN CORPORATION, Osaka (JP)

(72) Inventors: Shiro Tamura, Shizuoka (JP); Minoru Suzuki, Shizuoka (JP); Shinya Taikou, Shizuoka (JP)

(73) Assignee: NTN CORPORATION, Osaka (JP)

( * ) Notice: Subject to any disclaimer, the term of this patent is extended or adjusted under 35 U.S.C. 154(b) by 0 days.

(21) Appl. No.: 16/342,253

(22) PCT Filed: Nov. 24, 2016

(86) PCT No.: PCT/JP2016/084734
§ 371 (c)(1),
(2) Date: Apr. 16, 2019

(87) PCT Pub. No.: WO2018/078890
PCT Pub. Date: May 3, 2018

(65) Prior Publication Data
US 2019/0248224 A1 Aug. 15, 2019

(30) Foreign Application Priority Data

Oct. 31, 2016 (JP) .............................. JP2016-213119

(51) Int. Cl.
*B60K 7/00* (2006.01)
*H02K 7/116* (2006.01)
(Continued)

(52) U.S. Cl.
CPC .............. *B60K 7/0007* (2013.01); *B60K 1/02* (2013.01); *B60K 7/00* (2013.01); *F16H 1/06* (2013.01);
(Continued)

(58) Field of Classification Search
CPC ........ H02K 7/006; H02K 7/083; H02K 7/116; F16H 1/08; F16H 1/06; F16H 57/021;
(Continued)

(56) References Cited

U.S. PATENT DOCUMENTS 5,691,584 A * 11/1997 Toida .................... B60K 7/0007
180/65.51
7,210,851 B2 * 5/2007 Tsukada .................. F16C 35/04
384/537
(Continued)

FOREIGN PATENT DOCUMENTS

JP 7-81436 3/1995
JP 9-263144 10/1997
(Continued)

OTHER PUBLICATIONS

International Search Report dated Feb. 7, 2017 in International (PCT) Application No. PCT/JP2016/084734.
(Continued)

*Primary Examiner* — Steve Clemmons
(74) *Attorney, Agent, or Firm* — Wenderoth, Lind & Ponack, L.L.P.

(57) ABSTRACT

An in-wheel motor drive device includes an electric motor section, a speed reducer section, a wheel bearing section, and a casing. The speed reducer section includes a speed-reduction structure using a parallel shaft gear. The parallel shaft gear includes an input shaft, which is coupled to the electric motor section, an input gear, at least one intermediate shaft including input-side and output-side intermediate gears, an output shaft, which is coupled to the wheel bearing section, and a final output gear. The input, intermediate, and output shafts are supported by rolling bearings to be rotatable. At least two rolling bearings configured to support the intermediate and output shafts on an out-board side and two rolling bearings configured to support the intermediate and
(Continued)

output shafts on an in-board side are arranged at positions at which respective bearing widths are prevented from being superimposed with each other in an axial direction.

2 Claims, 5 Drawing Sheets

(51) Int. Cl.
| | | |
|---|---|---|
| *F16H 1/08* | (2006.01) | |
| *F16H 1/06* | (2006.01) | |
| *H02K 7/00* | (2006.01) | |
| *B60K 1/02* | (2006.01) | |
| *H02K 7/08* | (2006.01) | |

(52) U.S. Cl.
CPC .............. *F16H 1/08* (2013.01); *H02K 7/006* (2013.01); *H02K 7/083* (2013.01); *H02K 7/116* (2013.01); *B60K 2007/0038* (2013.01); *B60K 2007/0061* (2013.01)

(58) Field of Classification Search
CPC ... F16H 2057/0216; F16H 2057/02086; B60K 7/00; B60K 7/0007; B60K 2007/0038; B60K 2007/0061
See application file for complete search history.

(56) References Cited

U.S. PATENT DOCUMENTS

| | | | |
|---|---|---|---|
| 9,340,104 B2 * | 5/2016 | Kanatani | B60K 7/0007 |
| 9,403,429 B2 * | 8/2016 | Baumgartner | B60K 7/0007 |
| 2003/0029660 A1 | 2/2003 | Higaki et al. | |
| 2012/0000724 A1 * | 1/2012 | Mimura | B60K 7/0007 180/291 |
| 2013/0284528 A1 | 10/2013 | Kawasaki et al. | |

FOREIGN PATENT DOCUMENTS

| | | | |
|---|---|---|---|
| JP | 2004114858 A * | 4/2004 | |
| JP | 2008184110 A * | 8/2008 | |
| JP | 2009090921 A * | 4/2009 | |
| JP | 2013-209016 | 10/2013 | |
| WO | WO-0035698 A1 * | 6/2000 | .......... B60K 7/0015 |
| WO | WO-2014013084 A1 * | 1/2014 | .......... B60K 17/043 |

OTHER PUBLICATIONS

International Preliminary Report on Patentability and Written Opinion of the International Searching Authority dated Apr. 30, 2019 in International (PCT) Application No. PCT/JP2016/084734.
Extended European Search Report dated May 4, 2020 in counterpart European Patent Application No. 16919703.5.

* cited by examiner

IN-WHEEL MOTOR DRIVE DEVICE

TECHNICAL FIELD

The present invention relates to an in-wheel motor drive device having a structure in which an output shaft of an electric motor section and a wheel bearing section are connected to each other via a speed reducer section.

BACKGROUND ART

An in-wheel motor drive device is accommodated inside a wheel, and thus becomes unsprung weight of a vehicle. Increase in unsprung weight deteriorates a ride comfort of a vehicle. Thus, reduction in weight and size of the in-wheel motor drive device is an important requirement. Output torque of an electric motor is proportional to size and weight of the electric motor. Thus, in order to generate torque required for drive of the vehicle solely by a motor, a motor having a large size is required. Therefore, there is adopted a measure for reducing the size through use of the electric motor in combination with the speed reducer.

However, when the electric motor, the speed reducer, and a wheel bearing are arrayed in series, the amount of projection of the in-wheel motor drive device from the wheel to the in-board side becomes larger. In a case in which a space for a wheel housing is the same as that of a vehicle with an internal combustion engine, when a vehicle is steered or vertically moved, interference occurs between a vehicle body and the in-wheel motor drive device. Therefore, it is required to reduce a movable range of a tire, or modify the vehicle body for the in-wheel motor drive device.

As a related art, there has been proposed an in-wheel motor drive device having the following configuration (Patent Document 1). Specifically, rotation of an electric motor is reduced in speed and transmitted from an output shaft of a speed reduction mechanism to a driving wheel. The speed reduction mechanism is formed of a parallel-shaft gear train, and the parallel-shaft gear train allows a rotation shaft of the electric motor to be arranged while being offset upward in a vertical direction of the vehicle. In this in-wheel motor drive device, the rotation shaft of the electric motor is offset in a radial direction with respect to an axis center of the wheel bearing. With this, for example, a connection point to a suspension mechanism and a brake caliper mounting portion can be provided in a space in the wheel which is not occupied by the electric motor. Moreover, the in-wheel motor drive device can be reduced in size as a whole, and hence interference with the vehicle body or suspension parts caused by a turning motion by a steering mechanism or a vertical motion by the suspension mechanism can easily be avoided.

PRIOR ART DOCUMENTS

Patent Documents
  Patent Document 1: JP 2013-209016 A

SUMMARY OF THE INVENTION

Problems to be Solved by the Invention

In the in-wheel motor drive device, as described in Patent Document 1, the parallel shaft gear speed reducer is applied to achieve offset arrangement of the electric motor, and downsizing the in-wheel motor drive device in the axial direction. However, a structure of accommodating the entirety of the in-wheel motor drive device including the electric motor in a cylindrical space on an inner periphery of a wheel has not been achieved. Therefore, the following problems are conceivable. Specifically, limitation is added to the shapes of suspension parts, with the result that adverse effects such as increase in weight and degradation in strength of the suspension parts as well as reduction in minimum clearance height may occur. Moreover, design change on the vehicle body side is required in order to avoid interference, with the result that the motion performance of the vehicle may be degraded, and cost merit in standardization of the vehicle body may be lost.

With regard to the parallel shaft gear speed reducer, it has been found that an inter-axis distance between an output shaft including a final output gear and an intermediate shaft including an intermediate gear need to be determined in consideration of requirements on the gear side, requirements on the bearing side, and the structure for mounting to the suspension device. Specifically, as the requirements on the gear side, when the final output gear is excessively large in diameter, interference with a lower arm of the suspension device may occur. Moreover, when the intermediate gear is excessively small in diameter, the function as a gear is lost. As the requirements on the bearing side, it is required that a diameter of each of the rolling elements or a pitch circle diameter of the rolling elements be set large so as to prevent a contact ellipse between the rolling elements and the raceway surface from riding over a shoulder of the raceway surface due to application of a large radial load and a large thrust load. In relation to such requirements, the following problems have been found. For example, the inter-axis distance between the output shaft and the intermediate shaft is determined based on the requirements on the bearing side while the requirements on the gear side are not optimally satisfied, and sufficient downsizing in the radial direction cannot be achieved. Further, it is also required to secure a space for the structure for mounting to the suspension device. The problems described above were found in the course of downsizing the in-wheel motor drive device including the parallel shaft gear speed reducer in the radial direction, and the present invention gives focus on those problems.

In view of the problems described above, the present invention has an object to achieve downsizing of an in-wheel motor drive device comprising a parallel shaft gear speed reducer in a radial direction thereof and improve motion performance and mountability to a vehicle.
Solution to the Problems As a result of extensive studies conducted to achieve the object, the inventors of the present invention have arrived at novel conception of eliminating the mutual dependency in terms of dimension between the determination requirements on the gear side and the determination requirements on the bearing side described above and securing a space for the structure for mounting to the suspension device, and achieved the present invention.

According to one embodiment of the present invention, which has been devised to achieve the above-mentioned object, there is provided an in-wheel motor drive device, comprising: an electric motor section; a speed reducer section; a wheel bearing section; and a casing, wherein the speed reducer section comprises a speed-reduction structure using a parallel shaft gear, wherein the parallel shaft gear comprises: an input shaft, which is coupled to the electric motor section, and comprises an input gear; one or a plurality of intermediate shafts each comprising an input-side intermediate gear and an output-side intermediate gear; and an output shaft, which is coupled to the wheel bearing section, and comprises a final output gear, wherein the input shaft, the intermediate shaft, and the output shaft are supported at respective both end portions by rolling bearings so as to be rotatable, and wherein at least two rolling bearings on one side among the two rolling bearings configured to support the intermediate shaft and the output shaft on an out-board side and the two rolling bearings configured to support the intermediate shaft and the output shaft on an in-board side are arranged at positions at which respective bearing widths are prevented from being superimposed with each other in the axial direction.

With the configuration described above, it is possible to achieve downsizing of the in-wheel motor drive device comprising a parallel shaft gear speed reducer in a radial direction thereof and improve motion performance and mountability to a vehicle.

It is preferred that the two rolling bearings, which are arranged at the positions at which the respective bearing widths are prevented from being superimposed with each other in the axial direction, comprise rolling bearings configured to support the intermediate shaft and the output shaft on the out-board side, and that the rolling bearing configured to support the output shaft be deviated toward the in-board side with respect to the rolling bearing configured to support the intermediate shaft. With this, downsizing of the in-wheel motor drive device in the radial direction can be achieved, and the space for the structure for mounting to the suspension device can be secured.

The speed-reduction structure described above comprises a two-stage parallel shaft gear. With this, the number of components can be reduced, thereby being capable of achieving both high speed-reduction ratio and the downsizing.

Effects of the Invention

According to the present invention, the downsizing of the in-wheel motor drive device comprising a parallel shaft gear speed reducer in the radial direction can be achieved, and motion performance and mountability to a vehicle can be improved.

EMBODIMENTS OF THE INVENTION

Figure 5:
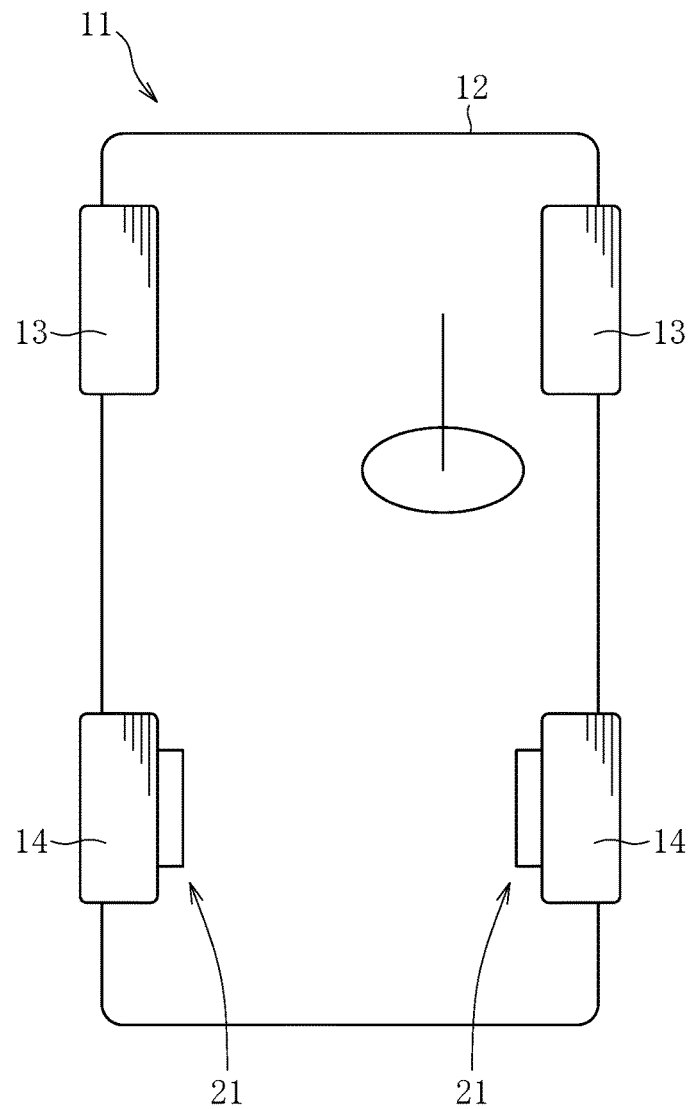
FIG. 5 is a plan view for illustrating a schematic configuration of an electric vehicle on which in-wheel motor drive devices are mounted.
Figure 6:
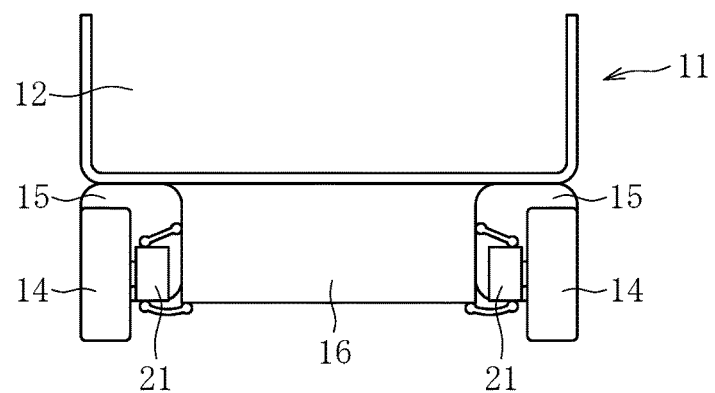
FIG. 6 is a rear sectional view for illustrating the electric vehicle of FIG. 5.

An in-wheel motor drive device according to a first embodiment of the present invention is described with reference to FIG. 1 to FIG. 3, FIG. 5, and FIG. 6. First, with reference to FIG. 5 and FIG. 6, description is made of an electric vehicle on which in-wheel motor drive devices according to this embodiment are mounted. FIG. 5 is a schematic plan view for illustrating an electric vehicle 11 on which in-wheel motor drive devices 21 are mounted, and FIG. 6 is a schematic sectional view for illustrating the electric vehicle 11 as viewed from a rear side.

As illustrated in FIG. 5, the electric vehicle 11 comprises a chassis 12, front wheels 13 serving as steered wheels, rear wheels 14 serving as driving wheels, and the in-wheel motor drive devices 21 configured to transmit driving force to the rear wheels 14. As illustrated in FIG. 6, each rear wheel 14 is accommodated inside a wheel housing 15 of the chassis 12 and fixed below the chassis 12 via a suspension device (suspension) 16.

In the suspension device 16, horizontally extending suspension arms are configured to support the rear wheels 14, and a strut comprising a coil spring and a shock absorber is configured to absorb vibrations that each rear wheel 14 receives from the ground to suppress the vibrations of the chassis 12. In addition, a stabilizer configured to suppress tilting of a vehicle body during turning and other operations is provided at connecting portions of the right and left suspension arms. In order to improve the property of following irregularities of a road surface to transmit the driving force of the rear wheels 14 to the road surface efficiently, the suspension device 16 is an independent suspension type capable of independently moving the right and left wheels up and down.

The electric vehicle 11 does not need to comprise a motor, a drive shaft, a differential gear mechanism, and other components on the chassis 12 because the in-wheel motor drive devices 21 configured to drive the right and left rear wheels 14, respectively, are arranged inside the wheel housings 15. Accordingly, the electric vehicle 11 has the advantages in that a large passenger compartment space can be provided and that rotation of the right and left rear wheels 14 can be controlled, respectively.

Prior to the description of a characteristic configuration of the first embodiment, an overall configuration of the in-wheel motor drive device 21 is described with reference to FIG. 1 to FIG. 3. In the following description, under a state in which the in-wheel motor drive device 21 is mounted to the vehicle, a side closer to an outer side of the vehicle is referred to as "out-board side", and a side closer to a center is referred to as "in-board side". The terms "out-board side" and "in-board side" given in Claims are used with the meanings described above.

Figure 1:
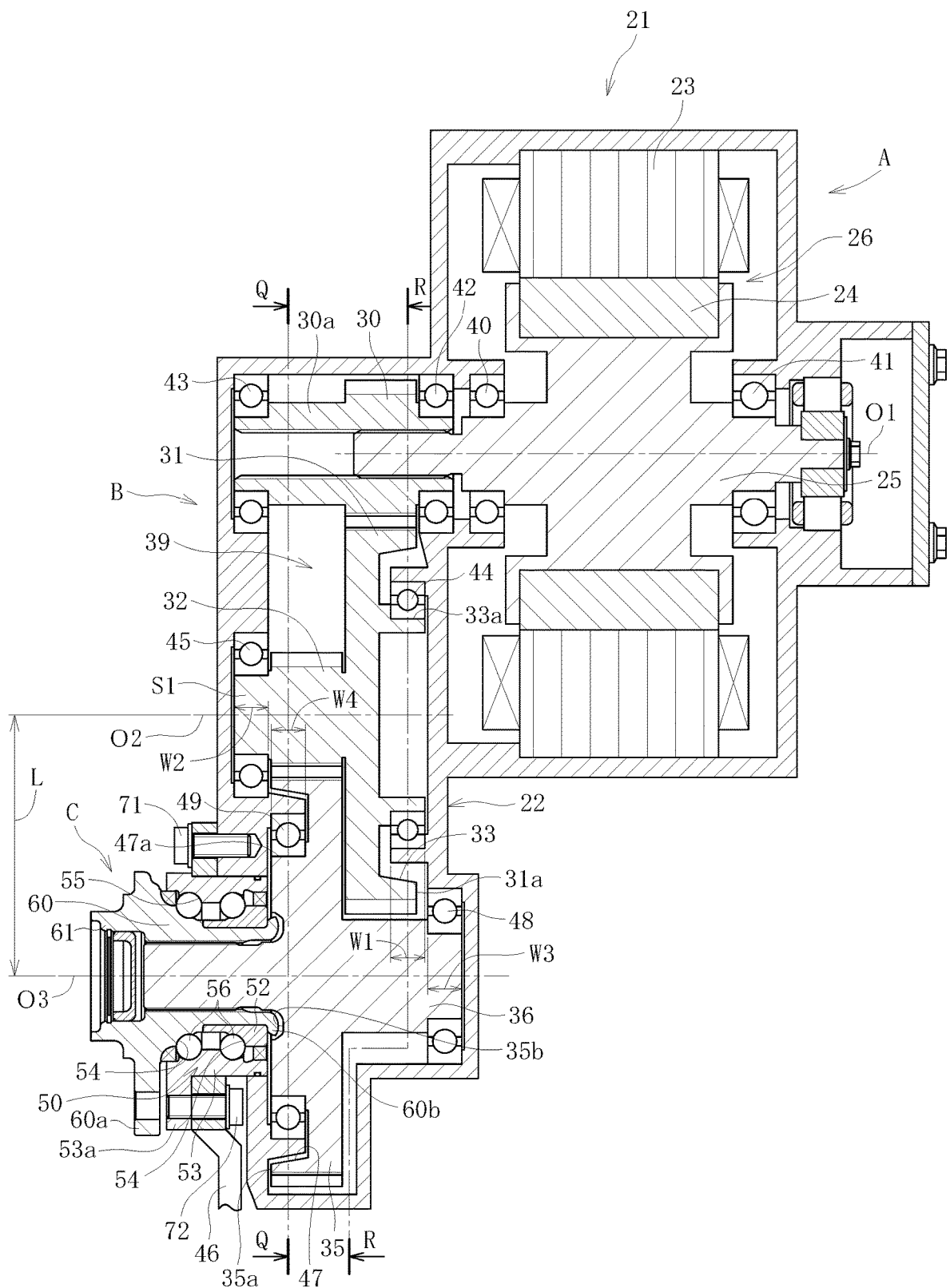
FIG. 1 is a vertical sectional view for illustrating an in-wheel motor drive device according to a first embodiment of the present invention, which is taken along the line P-P of FIG. 2 and viewed in the direction indicated by the arrows.
Figure 2:
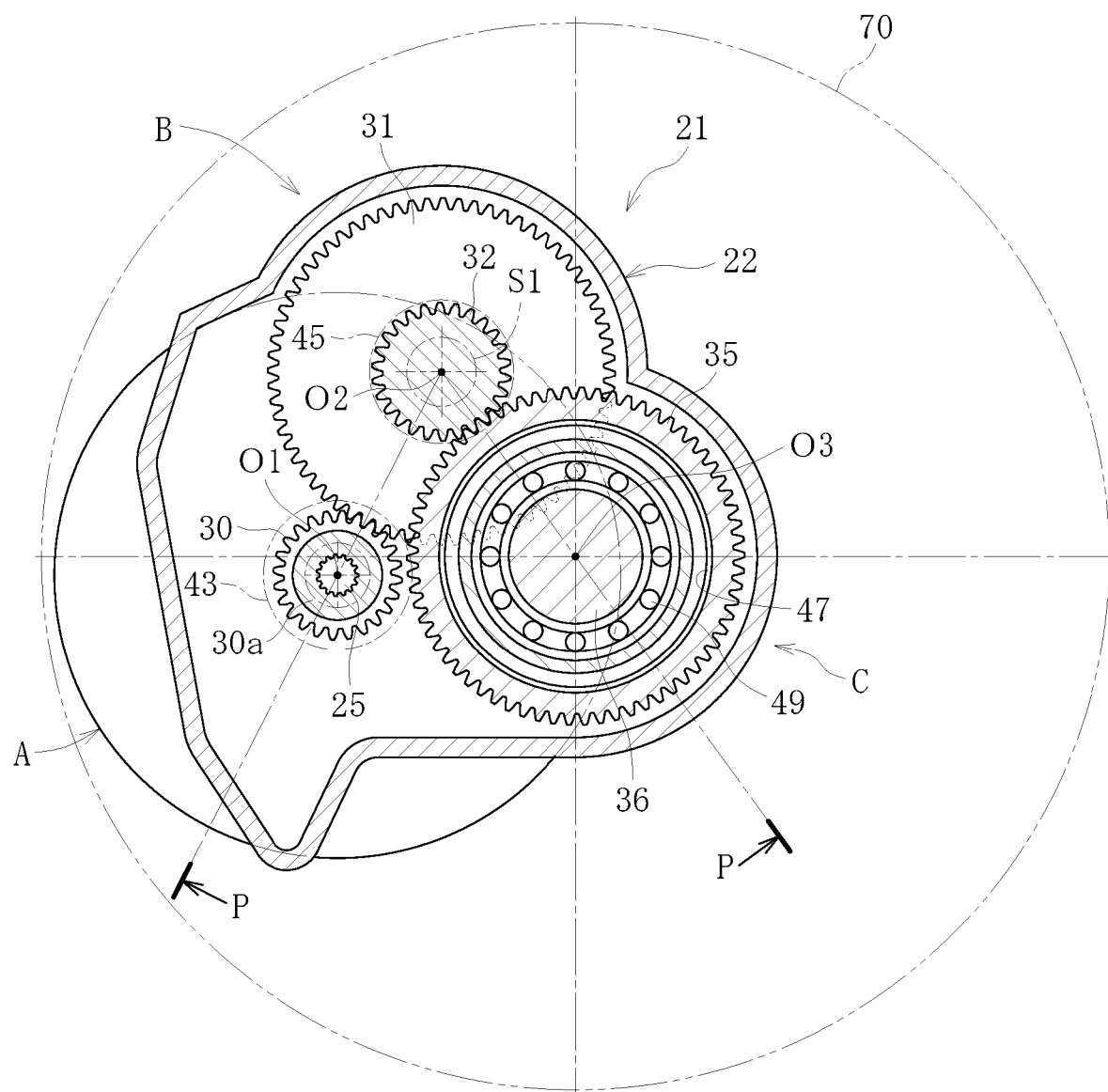
FIG. 2 is a transverse sectional view for illustrating the in-wheel motor drive device, which is taken along the line Q-Q of FIG. 1 and viewed in the direction indicated by the arrows.

FIG. 1 is a vertical sectional view for illustrating an in-wheel motor drive device according to one embodiment of the present invention, which is taken along the line P-P of FIG. 2 and viewed in the direction indicated by the arrows. FIG. 2 is a transverse sectional view for illustrating the in-wheel motor drive device, which is taken along the line Q-Q of FIG. 1 and viewed in the direction indicated by the arrows. FIG. 3 is a transverse sectional view for illustrating the in-wheel motor drive device, which is taken along the line R-R of FIG. 1 and viewed in the direction indicated by the arrows.

As illustrated in FIG. 1, the in-wheel motor drive device 21 comprises an electric motor section A configured to generate driving force, a speed reducer section B configured to reduce a speed of rotation of the electric motor section A to output the rotation, and a wheel bearing section C configured to transmit the output from the speed reducer section B to the rear wheels serving as driving wheels. The electric motor section A, the speed reducer section B, and the wheel bearing section C are accommodated in or mounted to a casing 22. The casing 22 may have a unified structure as illustrated in FIG. 1, or may have a dividable structure.

The electric motor section A is constructed by a radial gap type electric motor 26 comprising a stator 23 fixed to the casing 22, a rotor 24 arranged on a radially inner side of the stator 23 at an opposed position with a gap, and a motor rotation shaft 25, which is arranged on a radially inner side of the rotor 24 so as to rotate integrally with the rotor 24. The motor rotation shaft 25 is rotatable at high speed of about ten and several thousand rotations per minute. The stator 23 is formed by winding a coil around a magnetic core, and the rotor 24 comprises, for example, a permanent magnet.

The motor rotation shaft 25 is rotatably supported by a rolling bearing 40 at one end portion in its axial direction (left side of FIG. 1) and by a rolling bearing 41 at another end portion in the axial direction (right side of FIG. 1) with respect to the casing 22, respectively.

The speed reducer section B comprises an input gear 30, an input-side intermediate gear 31 and an output-side intermediate gear 32, which are intermediate gears, and a final output gear 35. The input gear 30 integrally comprises an input shaft 30a. The input shaft 30a is coaxially connected to the motor rotation shaft 25 by spline fitting (including serration fitting, which similarly applies in the following description). An intermediate shaft S1 comprising the input-side intermediate gear 31 and the output-side intermediate gear 32 is formed integrally with the intermediate gears 31 and 32. An output shaft 36 comprising the final output gear 35 is formed integrally with the final output gear 35.

The input shaft 30a, the intermediate shaft S1, and the output shaft 36 are arranged in parallel with each other. The input shaft 30a is supported at its both end portions by rolling bearings 42 and 43 so as to be freely rotatable relative to the casing 22. The intermediate shaft S1 is supported at its both end portions by rolling bearings 44 and 45 so as to be freely rotatable relative to the casing 22. The output shaft 36 is supported at its both end portions by rolling bearings 48 and 49 so as to be freely rotatable relative to the casing 22. The both end portions of each of the input shaft 30a, the intermediate shaft S1, and the output shaft 36 are not limited to respective shaft end portions. For example, as illustrated in FIG. 1, the both end portions encompass halfway positions on the outer side (out-board side) of the final output gear 35 of the output shaft 36. Briefly, the input shaft 30a is supported at its both end portions by the rolling bearings 42 and 43, the intermediate shaft S1 is supported at its both end portions by the rolling bearings 44 and 45, and the output shaft 36 is supported at its both end portions by the rolling bearings 48 and 49. In Description and Claims, the term "both end portions" of each of the input shaft, the intermediate shaft, and the output shaft is used with the meaning described above.

Figure 3:
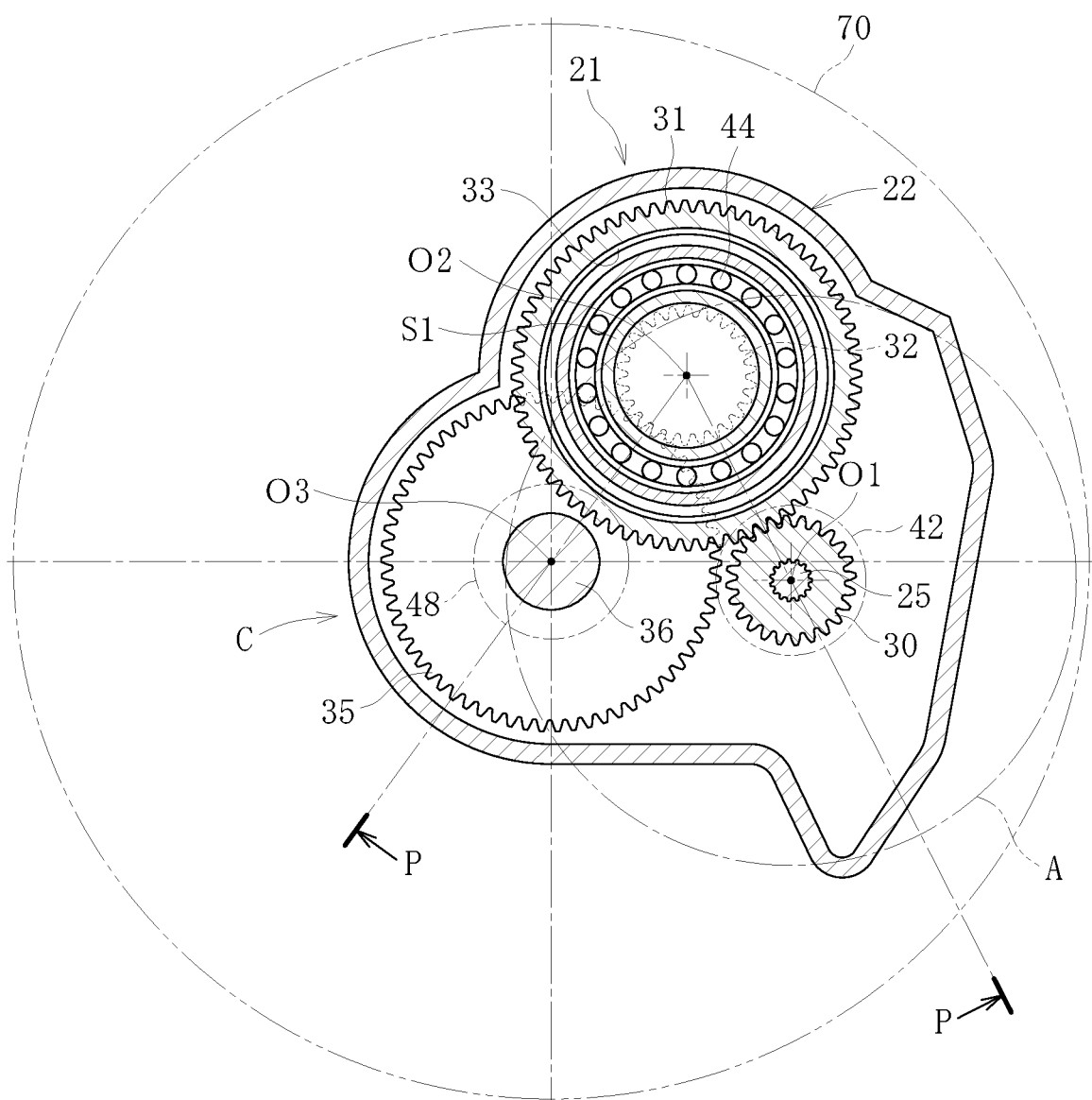
FIG. 3 is a transverse sectional view for illustrating the in-wheel motor drive device, which is taken along the line R-R of FIG. 1 and viewed in the direction indicated by the arrows.

As illustrated in FIG. 2 and FIG. 3, a center O2 of the intermediate shaft S1 is arranged between a center O1 of the input shaft 30a (which is also a center of the motor rotation shaft 25) of the speed reducer section B and a center O3 of the wheel bearing section C, and lines connecting the centers O1, O2, and O3 form a triangular shape. Such arrangement is adopted to achieve the downsizing of the outer peripheral contour of the in-wheel motor drive device 21. With this, the in-wheel motor drive device 21 can be mounted in a wheel 70 of an existing vehicle with an internal combustion engine.

FIG. 2 is a transverse sectional view taken along the line Q-Q of FIG. 1 and viewed in the direction indicated by the arrows, that is, as viewed from the out-board side. The rolling bearing 49 configured to support the output shaft 36 on the out-board side is arranged in a radially-inner-side recess portion 47 of the final output gear 35. As illustrated in FIG. 1, the rolling bearing 49 configured to support the output shaft 36 on the out-board side and the rolling bearing 45 configured to support the intermediate shaft S1 on the out-board side are arranged at positions at which respective bearing widths W4 and W2 of the rolling bearings 49 and 45 are prevented from being superimposed with each other in the axial direction. Moreover, FIG. 3 is a transverse sectional view taken along the line R-R of FIG. 1 and viewed in the direction indicated by the arrows, that is, as viewed from the in-board side. The rolling bearing 44 configured to support the intermediate shaft S1 on the in-board side is arranged in a radially-inner-side recess portion 33 of the input-side intermediate gear 31. As illustrated in FIG. 1, the rolling bearing 48 configured to support the output shaft 36 on the in-board side and the rolling bearing 44 configured to support the intermediate shaft S1 on the in-board side are arranged at positions at which respective bearing widths W3 and W1 of the rolling bearings 48 and 44 are prevented from being superimposed with each other in the axial direction. Details are described later.

As illustrated in FIG. 1, in the speed reducer section B, the input gear 30 and the input-side intermediate gear 31 mesh with each other, and the output-side intermediate gear 32 and the final output gear 35 mesh with each other. The number of teeth of the input-side intermediate gear 31 is larger than the number of teeth of each of the input gear 30 and the output-side intermediate gear 32, and the number of teeth of the final output gear 35 is larger than the number of teeth of the output-side intermediate gear 32. With the configuration described above, a parallel shaft gear speed reducer 39 is configured so as to reduce the speed of the rotary motion of the motor rotation shaft 25 in two stages. The speed reduction mechanism comprising parallel shaft gears in two stages has a relatively smaller number of components. Further, in association with an arrangement structure of the parallel shaft gears and the support bearings described later, both high speed-reduction ratio and the downsizing can be achieved.

In this embodiment, helical gears are used as the input gear 30, the input-side intermediate gear 31, the output-side intermediate gear 32, and the final output gear 35 forming the speed reducer 39. With the helical gears, the number of teeth which are simultaneously in mesh becomes larger, and teeth contact is dispersed. Therefore, the helical gears are effective in quietness and less torque fluctuation. In consideration of a meshing ratio and a limit rotation number of the gears, it is preferred that the modules of the gears be set to from 1 to 3.

The wheel bearing section C is constructed by a wheel bearing 50 of an inner-ring rotation type. The wheel bearing 50 is a double-row angular contact ball bearing mainly comprising an inner member 61, an outer ring 53, balls 56, and a retainer (not shown). The inner member 61 comprises a hub ring 60 and an inner ring 52.

A flange portion 60a for mounting a wheel is formed on an outer periphery of the hub ring 60 on the out-board side, and the inner ring 52 is fitted and caulked so as to be fixed on a small-diameter step portion on the in-board side. After assembly of the wheel bearing 50, a caulked portion 60b fixes the inner ring 52 and applies a pre-load to the wheel bearing 50. An inner raceway surface 54 on the out-board side is formed on an outer periphery of the hub ring 60, and an inner raceway surface 54 on the in-board side is formed on an outer periphery of the inner ring 52. Although illustration is omitted, a brake disc and a wheel are mounted to the flange portion 60a for mounting a wheel. On an inner periphery of the outer ring 53, double-row outer raceway surfaces 55 are formed so as to correspond to the inner raceway surface 54 of the hub ring 60 and the inner raceway surface 54 of the inner ring 52. The output shaft 36 is fitted and coupled to the hub ring 60 by spline fitting in a torque-transmittable manner.

A flange portion 53a is formed on an outer periphery of the outer ring 53, and an attachment 46 is fastened and fixed to the flange portion 53a with a bolt 72. The attachment 46 is fastened and fixed to the casing 22 with a bolt 71 at a circumferential position different from a circumferential position of the bolt 72. With this, the wheel bearing 50 and the casing 22 are connected to each other through intermediation of the attachment 46. The attachment 46 extends downward in FIG. 1, and is fastened and fixed to a bracket of the suspension device with a bolt (not shown). As illustrated in FIG. 1, in the in-wheel motor drive device 21, a limited portion of the casing 22 which is located on a radially outer side of the wheel bearing 50 provides a space for the structure for mounting to the suspension device.

In the in-wheel motor drive device 21, for cooling of the electric motor 26 and for lubrication and cooling of the speed reducer 39, lubricating oil is fed to relevant portions by a rotary pump (not shown). The inside of the wheel bearing 50 is lubricated by grease.

The in-wheel motor drive device 21 is accommodated inside the wheel housing 15 (see FIG. 6), and thus becomes unsprung load. Therefore, the downsizing and the weight reduction are essentially required. Through combination of the parallel shaft gear speed reducer 39 having the configuration described above with the electric motor 26, the small-sized electric motor 26 with low torque and high-speed rotation can be used. For example, in a case in which the parallel shaft gear speed reducer 39 having a speed-reduction ratio of 11 is used, through use of the electric motor 26 with high-speed rotation of about ten and several thousand rotations per minute, the downsizing of the electric motor 26 can be achieved. With this, the compact in-wheel motor drive device 21 can be achieved. As a result, the unsprung weight is suppressed, thereby being capable of obtaining the electric vehicle 11 which is excellent in traveling stability and NVH characteristics.

The entire configuration of the in-wheel motor drive device 21 according to this embodiment is as described above. Characteristic configurations are described below.

In order to achieve the downsizing and weight reduction of the in-wheel motor drive device 21, it is effective to increase the speed-reduction ratio of each stage of the parallel shaft gear speed reducer 39. However, in connection with the arrangement relationship among the intermediate shaft S1 and the output shaft 36 arranged in parallel with each other as well as the rolling bearings 44, 45, 48, and 49 configured to support the intermediate shaft S1 and the output shaft 36, as mentioned above, it is required that an inter-axis distance L between the output shaft 36 comprising the final output gear 35 and the intermediate shaft S1 comprising the intermediate gears 31 and 32 be determined in consideration of the requirements on the gear side, the requirements on the bearing side, and the structure for mounting to the suspension device. The parallel shaft gear speed reducer 39 of the in-wheel motor drive device 21 according to the first embodiment has been achieved with novel conception of eliminating the mutual dependency in terms of dimension between the determination requirements on the gear side and the determination requirements on the bearing side and securing the space for the structure for mounting to the suspension device.

The in-wheel motor drive device 21 according to the first embodiment has such a characteristic configuration that at least two rolling bearings on one side among the two rolling bearings 45 and 49 configured to support the intermediate shaft S1 and the output shaft 36 of the parallel shaft gear speed reducer 39 on the out-board side and the two rolling bearings 44 and 48 configured to support the intermediate shaft S1 and the output shaft 36 on the in-board side are arranged so that respective bearing widths are prevented from being superimposed with each other in the axial direction.

As illustrated in FIG. 1, the two rolling bearings 45 and 49 configured to support the out-board side are arranged at positions at which the bearing widths W2 and W4 of the two rolling bearings 45 and 49 are prevented from being superimposed with each other in the axial direction, and the two rolling bearings 44 and 48 configured to support the in-board side are arranged at positions at which the bearing widths W1 and W3 of the two rolling bearings 44 and 48 are prevented from being superimposed with each other in the axial direction. With this, the limitation in terms of radial dimension is eliminated between the two rolling bearings 45 and 49 and between the two rolling bearings 44 and 48, and hence the mutual dependency in terms of dimension between the determination requirements on the gear side and the determination requirements on the bearing side is eliminated, thereby improving a degree of freedom in design. For example, when the deviation amount in the axial direction (distance between bearing end surfaces) of the bearing widths W2 and W4 of the two rolling bearings 45 and 49 on the out-board side and the direction of incorporating the rolling bearing 45 onto the mounting surface are suitably changed, the structure in which radially outer surfaces of the two rolling bearings 45 and 49 are arranged extremely close to each other and the structure in which the radially outer surfaces are superimposed with each other in the radial direction can also be achieved.

Therefore, the specifications such as the number of teeth and a pitch circle diameter of each of the input-side intermediate gear 31, the output-side intermediate gear 32, and the final output gear 35 can be optimized based only on use conditions on the gear side. As a result of the optimization, the inter-axis distance L between the intermediate shaft S1 and the output shaft 36 is determined.

Moreover, the rolling bearings 44, 45, 48, and 49 configured to support the both end portions of each of the intermediate shaft S1 and the output shaft 36 bear a large radial load and a large thrust load from the input-side intermediate gear 31, the output-side intermediate gear 32, and the final output gear 35 formed of the helical gears. It is required that the diameter of each of the rolling elements or the pitch circle diameter of the rolling elements be set large so as to prevent a contact ellipse between the rolling elements and the raceway surface from riding over the shoulder of the raceway surface due to those loads. However, the bearing specifications can be optimized and determined based only on the use conditions on the bearing side.

Moreover, when the rolling bearing 49 configured to support the output shaft 36 on the out-board side is deviated toward the in-board side with respect to the rolling bearing 45 configured to support the intermediate shaft S1 on the out-board side, a space for the structure for mounting to the suspension device such as a structure for fastening and fixing the attachment 46 to the casing 22 with the bolt 71 can be secured.

As illustrated in FIG. 1, the intermediate shaft S1 comprising the input-side intermediate gear 31 and the output-side intermediate gear 32 is supported at its both end portions by the rolling bearings 44 and 45, and the output shaft 36 comprising the final output gear 35 is supported at its both end portions by the rolling bearings 48 and 49. The input-side intermediate gear 31 has a large diameter and comprises the radially-inner-side recess portion 33 in a width surface 31a on the in-board side. The radially-inner-side recess portion 33 comprises a mounting surface 33a configured to receive the inner ring of the rolling bearing 44 to be fitted thereto. With this, the rolling bearings 44 and 48 configured to support the in-board side are arranged at positions at which the bearing widths W1 and W3 of the rolling bearings 44 and 48 are prevented from being superimposed with each other in the axial direction. Moreover, the reduction in axial dimension and reduction in weight of the input-side intermediate gear 31 are achieved.

Moreover, the final output gear 35 also has a large diameter. The radially-inner-side recess portion 47 is formed in a width surface 35a on the out-board side, and the radially-inner-side recess portion 47 comprises a mounting surface 47a configured to receive the inner ring of the rolling bearing 49 to be fitted thereto. With this, the rolling bearings 45 and 49 configured to support the out-board side are arranged at positions at which the bearing widths W2 and W4 of the rolling bearings 45 and 49 are prevented from being superimposed with each other in the axial direction. Moreover, the reduction in axial dimension and reduction in weight of the final output gear 35 are achieved.

Figure 4:
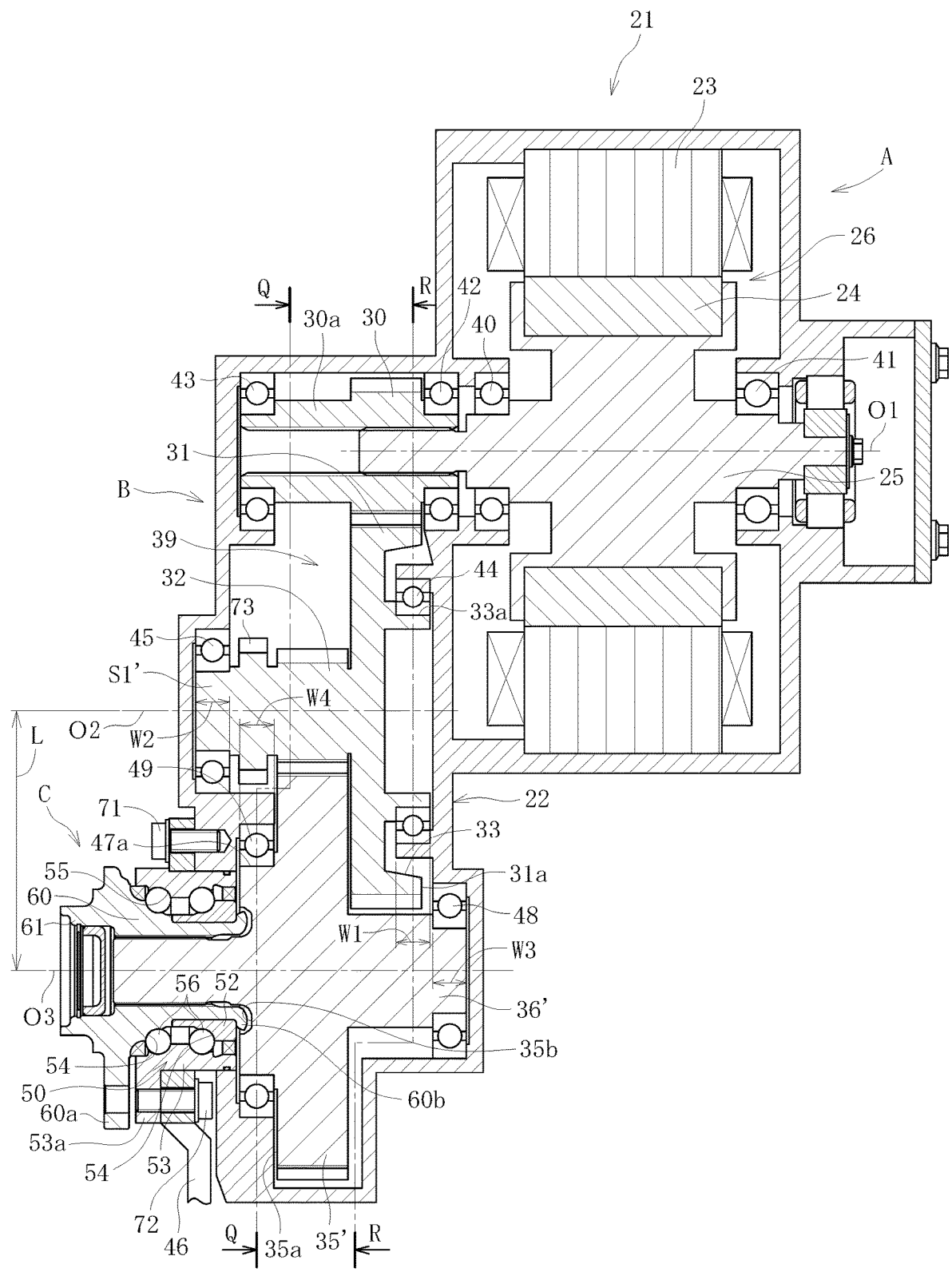
FIG. 4 is a vertical sectional view for illustrating an in-wheel motor drive device according to a second embodiment of the present invention, which is taken along the line P-P of FIG. 2 and viewed in the direction indicated by the arrows.

Next, with reference to FIG. 4, description is made of an in-wheel motor drive device according to a second embodiment of the present invention. The second embodiment is different from the first embodiment in that the radially-inner-side recess portion is not formed in the width surface of the final output gear on the out-board side and that a gear to be used for a parking lock mechanism is provided on the intermediate shaft. Other configurations are similar to those of the first embodiment. Therefore, parts having the same function are denoted by the same reference symbols, and only main points are described.

As illustrated in FIG. 4, in the second embodiment, the mounting surface 47a of the rolling bearing 49 is formed on the out-board side of the final output gear 35'. However, the width surface 35a is formed of a flat surface, and the radially-inner-side recess portion is not formed. However, also in the second embodiment, the two rolling bearings 45 and 49 configured to support the intermediate shaft S1' and the output shaft 36' on the out-board side are arranged at positions at which the bearing widths W2 and W4 of the two rolling bearings 45 and 49 are prevented from being superimposed with each other in the axial direction, and the two rolling bearings 44 and 48 configured to support the in-board side are arranged at positions at which the bearing widths W1 and W3 of the two rolling bearings 44 and 48 are prevented from being superimposed with each other in the axial direction.

In the second embodiment, there is given a structure in which the width surface of the final output gear 35' on the out-board side does not comprise the radially-inner-side recess portion. Therefore, a gear 73 to be used for the parking lock mechanism is provided in the space provided on the out-board side of the output-side intermediate gear 32 of the intermediate shaft S1'.

With regard to the bearing widths W2, W4, W1, and W3 of the two rolling bearings 45 and 49 configured to support the out-board side and the two rolling bearings 44 and 48 configured to support the in-board side, the actions and effects given by the configuration in which the two rolling bearings are arranged at positions at which the respective bearing widths are prevented from being superimposed with each other in the axial direction, the transverse sectional view taken along the line Q-Q of FIG. 4 as viewed from the out-board side in the direction indicated by the arrows, the transverse sectional view taken along the line R-R of FIG. 4 as viewed from the in-board side in the direction indicated by the arrows, and other configurations are similar to those of the first embodiment. Therefore, the description given above in the first embodiment is incorporated, and description is omitted.

In the embodiments described above, with regard to the two rolling bearings 45 and 49 and the two rolling bearings 44 and 48 on both sides, specifically, the two rolling bearings 45 and 49 configured to support the intermediate shaft S1, S1' and the output shaft 36, 36' on the out-board side and the two rolling bearings 44 and 48 configured to support the in-board side, illustration is given of the example in which the two rolling bearings are arranged at positions at which the bearing widths W2 and W4 and the bearing widths W1 and W3 are prevented from being superimposed with each other in the axial direction. However, the present invention is not limited to this configuration. Only the two rolling bearings 45 and 49 configured to support the out-board side may be arranged at positions at which the bearing widths W2 and W4 of the two rolling bearings 45 and 49 are prevented from being superimposed with each other in the axial direction, and the two rolling bearings 44 and 48 configured to support the in-board side may be arranged at positions at which the bearing widths W1 and W3 of the two rolling bearings 44 and 48 are superimposed with each other in the axial direction.

As the speed reducer section B of the in-wheel motor drive device 21 according to the embodiments described above, illustration is given of the case in which the parallel shaft gear speed reducer 39 with two-stage speed reduction is used. However, the present invention is not limited to this configuration. The parallel shaft gear speed reducer 39 may be of one-stage speed reduction or speed reduction of three stages or more.

The present invention is not limited to the above-mentioned embodiments. As a matter of course, the present invention may be carried out in various modes without departing from the gist of the present invention. The scope of the present invention is defined in the scope of claims, and encompasses equivalents described in claims and all changes within the scope of claims.

REFERENCE SIGNS LIST 21 in-wheel motor drive device
22 casing
25 motor rotation shaft
26 electric motor
30 input gear
30a input shaft
31 input-side intermediate gear
32 output-side intermediate gear
33 radially-inner-side recess portion
33a mounting surface
35 final output gear
36 output shaft
36' output shaft
39 speed reducer
44 rolling bearing 46 attachment
47 radially-inner-side recess portion
49 rolling bearing
50 wheel bearing
52 inner ring
53 outer ring
53a flange portion
60 hub ring
60b caulked portion
71 bolt
72 bolt
A electric motor section
B speed reducer section
C wheel bearing section
L inter axis distance
S1 intermediate shaft
S1' intermediate shaft
W1 bearing width
W2 bearing width
W3 bearing width
W4 bearing width

The invention claimed is:

1. An in-wheel motor drive device, comprising:
an electric motor section;
a speed reducer section;
a wheel bearing section; and
a casing,
wherein an outer peripheral contour of the in-wheel motor drive device including the electric motor section is fully accommodated within a cylindrical space defined by an inner periphery of a wheel, and the in-wheel motor drive device is configured to be mounted to a suspension device,
wherein the speed reducer section comprises a speed-reduction structure using a parallel shaft gear,
wherein the parallel shaft gear comprises:
an input shaft, which is coupled to the electric motor section, and comprises an input gear;
one or a plurality of intermediate shafts each comprising an input-side intermediate gear and an output-side intermediate gear; and
an output shaft, which is coupled to the wheel bearing section, and comprises a final output gear,
wherein the input shaft, the intermediate shaft, and the output shaft are supported at respective both end portions by rolling bearings so as to be rotatable,
wherein the two rolling bearings configured to support the intermediate shaft and the output shaft on an out-board side are arranged at positions at which respective bearing widths of the two rolling bearings are prevented from being superimposed with each other in an axial direction, and
wherein the rolling bearing configured to support the output shaft of the two rolling bearings configured to support the intermediate shaft and the output shaft on the out-board side is deviated toward an in-board side with respect to the rolling bearing configured to support the intermediate shaft of the two rolling bearings configured to support the intermediate shaft and the output shaft on the out-board side.

2. The in-wheel motor drive device according to claim 1, wherein the speed-reduction structure comprises a two-stage parallel shaft gear.

* * * * *